United States Patent [19]

Moyer

[11] Patent Number: 4,746,423
[45] Date of Patent: May 24, 1988

[54] IN-WELL PUMP SKIMMER

[75] Inventor: Donald L. Moyer, Harrisburg, Pa.

[73] Assignee: R. E. Wright Associates, Middletown, Pa.

[21] Appl. No.: 907,456

[22] Filed: Sep. 15, 1986

[51] Int. Cl.⁴ .................... E21B 43/38; E02B 15/04
[52] U.S. Cl. .................... 210/104; 210/117; 210/121; 210/136; 210/923; 417/36; 166/53; 166/265; 166/325
[58] Field of Search ............... 210/776, 774, 923, 921, 210/104, 103, 98, 109, 115, 117, 121, 136, 138, 242.3; 417/113, 138, 118, 36, 143; 166/265, 53, 65.1, 107, 369, 325

[56] References Cited

U.S. PATENT DOCUMENTS

| 3,901,811 | 8/1975 | Finch | 210/538 |
| 3,915,225 | 10/1975 | Swink | 166/53 |
| 4,187,912 | 2/1980 | Cramer | 166/107 |
| 4,273,650 | 6/1981 | Solomon | 210/104 |
| 4,431,534 | 2/1984 | Gordon | 210/110 |
| 4,466,777 | 8/1984 | Kimberlin | 417/36 |
| 4,469,170 | 9/1984 | Farmer | 166/53 |
| 4,527,633 | 7/1985 | McLaughlin et al. | 166/53 |
| 4,625,807 | 12/1986 | Harlon | 210/923 |

Primary Examiner—Richard V. Fisher
Assistant Examiner—Richard D. Jordan
Attorney, Agent, or Firm—Martin Fruitman

[57] ABSTRACT

A two pump skimmer system for recovery of lighter-than-water hydrocarbons from water wells. A water pump is used to depress the water table and a contaminant pump is used to remove the hydrocarbons. The pumps are located in individual chambers which are interconnected, with the water chamber below the hydrocarbon chamber and with limited one-way flow into the water chamber. Both pumps are independently controlled by sensors in the upper chamber to assure that each pumps only the proper liquid.

7 Claims, 2 Drawing Sheets

IN-WELL PUMP SKIMMER

SUMMARY OF THE INVENTION

This inention deals generally with liquid separation within underground wells and more specifically with an apparatus using a skimmer and pumps to remove hydrocarbons from a collecting well which contains both water and hydrocarbons.

The use of a "cone of depression" for collecting hydrocarbons from an underground water bearing zone is well established. The technique uses one pump located low in a well to remove water in large enough quantities to actually lower the water table locally, and thus causes underground liquids to drain toward the region in which the table is depressed.

This depression not only collects water, but also collects all other liquid which float atop the water because they have lower specific gravity than the water. The lighter liquids then collect within the well along with the water, and typically as the water is pumped out by the lower pump, a pump located higher in the well, in the region atop the collected water where the lighter fluids collect, is used to pump out the contaminants.

A number of variations on this technique include the use of electronic or float sensors or other devices to attempt to assure that the upper pump handles only contaminants and that the lower pump removes only water.

Despite these controls, the prior art systems have one consistent fault. It is that there are always contaminants, which are usually hydrocarbons, actually left in the well. This is always true because in order to prevent water from being pumped along with the hydrocarbons the hydrocarbon pump must be shut down somewhat before it runs out of hydrocarbons to pump. This is usually accomplished by sensing the water-hydrocarbon interface and shutting down the hydrocarbon pump before the interface approaches the pump input. While this method seems appropriate to equipment designers, its glaring fault is that there are always contaminants left in the well, and therefore there is always the risk of that contamination affecting other ground water supplies.

The present invention eliminates that risk by actually first isolating the contaminants from the well and then pumping them out of the ground. The contamination remaining when the contaminant pump is stopped is therefore trapped and can not contaminate any other ground water source.

This isolation is accomplished by using two pumps, each within its own container with a one way flow connection from the contaminant pump, located higher, to the water pump located below. Both pumps are controlled from sensors within the upper contaminant chamber, and the water pump also draws water from the well directly into its lower chamber, so that the water table in the well is maintained at just the top of the upper chamber.

The upper chamber has an open top and being at the very top of the water level in the well therefore acts as a skimmer and accumulates both the water and the contaminants which are entering the well. Once in the upper chamber, the water and contaminants are separated by gravity with the lighter contaminants above.

The contaminant pump is located within the upper chamber so that its input has only contaminant available and a conventional high level float control is used to start the contaminant pump. The float switch is located near the top of the contaminant chamber and turns the contaminant pump on if there is sufficient liquid to require pumping. The pump is stopped by a similar conventional control set somewhat lower than the high level control.

The water removal is independently controlled by a set of high-low probes which monitor water-contaminant interface in the contaminant chamber and increase or decrease the water flow from the well accordingly.

In the preferred embodiment the removal of water from the well is actually controlled by a combination of pump and solenoid valve in order to avoid frequent cycling of the pump and attain accurate control of the water flow.

The lower chamber in which the water pump is located is interconnected to the bottom of the higher contaminant chamber by a limited and unidirectional flow path. This path assures that water is removed from the contaminant chamber at the same rate at which it enters and also assures that no flow can occur in the reverse direction, from the lower water chamber to the contaminant chamber.

The water chamber draws its main supply from a second entry port located below the contaminant chamber. It is this second entry which constantly maintains the liquid in the entire well at the level of the top of the contaminant chamber. However, as it does, the limited feed from the contaminant chamber to the water chamber assures that the contaminant pump is not pumping water.

For fine control, the water discharge line is manually set by a valve at a flow rate which tends to slowly lower the liquid level in the well. A bypass path around the manual valve is then opened and closed by a solenoid valve controlled by the water level in the contaminant chamber.

The result is that as water spills over the top of the contaminant chamber, it sinks to the bottom and is pumped through the interconnection to the water chamber and out to the surface at the same time the water pump is drawing water directly from the well at the water chamber's lower inlet. The rate of removal of water from the contaminant chamber is varied by the water interface sensor's control of the water solenoid valve so that water never reaches the contaminant pump input and contaminant never reaches the water chamber.

The result is that contaminant accumulates, not within the well as in other systems, but only in an isolated chamber and, therefore, once contamination flows into the well at the point of the depressed water table it is effectively removed from the environment.

DETAILED DESCRIPTION OF THE INVENTION

Figure 1:
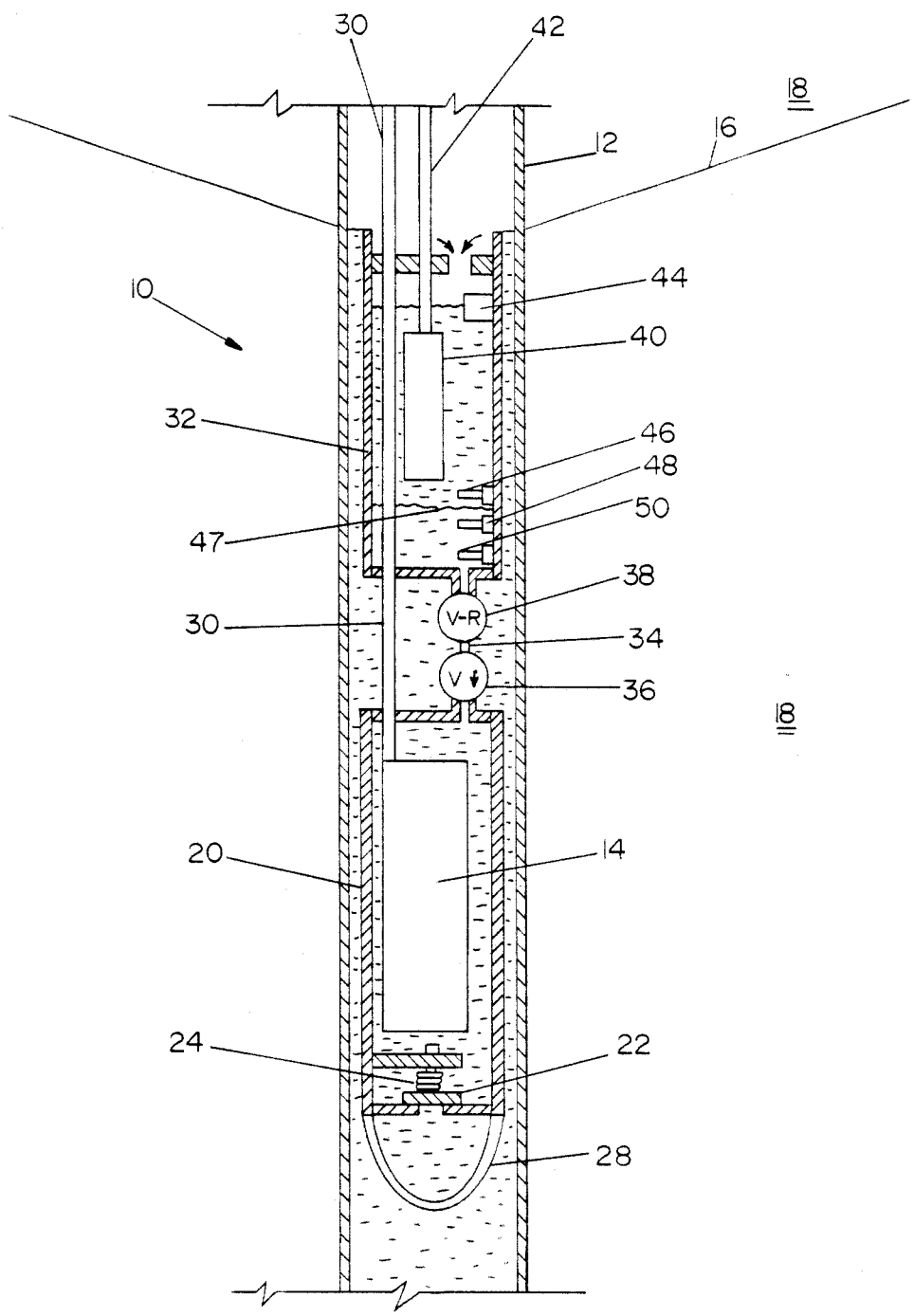
FIG. 1 is a simplified side cross section view of the preferred embodiment of the invention located within a well.

The preferred embodiment of the invention is shown in FIG. 1 in a simplified cross section view when it is located within a well. In-well pump skimmer 10 is suspended within well 12 by conventional means (not shown) at a level at or above the critical water bearing zone, and conventional water pump 14 operates to pump out water to that "cone of depression" 16 is formed within the ground 18.

The formation of such a "cone of depression" is a well established technique which is used to collect underground contaminants. Essentially, the water table is lowered in a local region by continuously pumping water from a well. The water from a considerable distance around the well then drains into it, but because of the earth's resistance to water flow, the upper boundary of the water table forms into a cone. This cone acts exactly as would a funnel for the lighter-than-water contaminants in the ground which essentially float atop the water table. The well at the center of the cone of depression therefore accumulates, not only the water from the area it drains, but also the lighter-than-water contaminants such as hydrocarbons.

In the preferred embodiment of the present invention, water pump 14 located within well 12 is operated at a pumping rate to slowly draw down the liquid level within well 12 so that cone of depression 16 is formed.

Unlike the systems of the prior art, however, water pump 14 is not located so as to be directly accessible to well 12 but is isolated from the well by water chamber 20. When water pump 14 is operating, water from within well 12 enters water chamber 20 through valve 22 which is normally held closed by spring 24. When water pump 14 is operating and creates a suction effect within water chamber 20, valve 22 is opened to draw in water because the pump suction overcomes the force of spring 24. Guard 28, constructed of rod in the preferred embodiment, serves to prevent accidental location of valve 22 within a sediment layer within well 12.

As can be appreciated from the previous explanation, valve 22 acts as a check valve to assure that liquid only flows into water chamber 20, and none flows out of water chamber 20 and into well 12. Water pump 14 pumps the water moving through it out of the well and to the surface through water pipe 30 which passes through but is not open to contaminant chamber 32.

Contaminant chamber 32 is located above water chamber 20 and is interconnected with it by pipe 34, check valve 36, and regulating valve 38. Contaminant pump 40, which is a conventional pump capable of handling hydrocarbons, is located within contaminant chamber 32 and its outlet is connected to contaminant pipe 42 through which it pumps its liquid to the ground surface above well 12. Contaminant chamber 32 is open only at its upper end and, as described before, interconnects with water chamber 20.

Contaminant chamber 32 contains two sets of liquid activated sensor for control of the two pumps. Upper sensor 44, which in the preferred embodiment is a float switch, is interconnected with and controls contaminant pump 40. Lower sensors 46 and 48 are interconnected with and control water pump 14. In the preferred embodiment lower sensors 46 and 48 are conventional conductivity probes which can distinguish between the presence of water and contaminant.

Additional sensor 50, also a conductivity probe in the preferred embodiment of the invention, is optional and located near the very bottom of contaminant chamber 32 and can be used in a safety shut off circuit, in the event of a malfunction of the other sensor, to prevent accidental mixing of contaminant with the water being pumped out.

Figure 2:
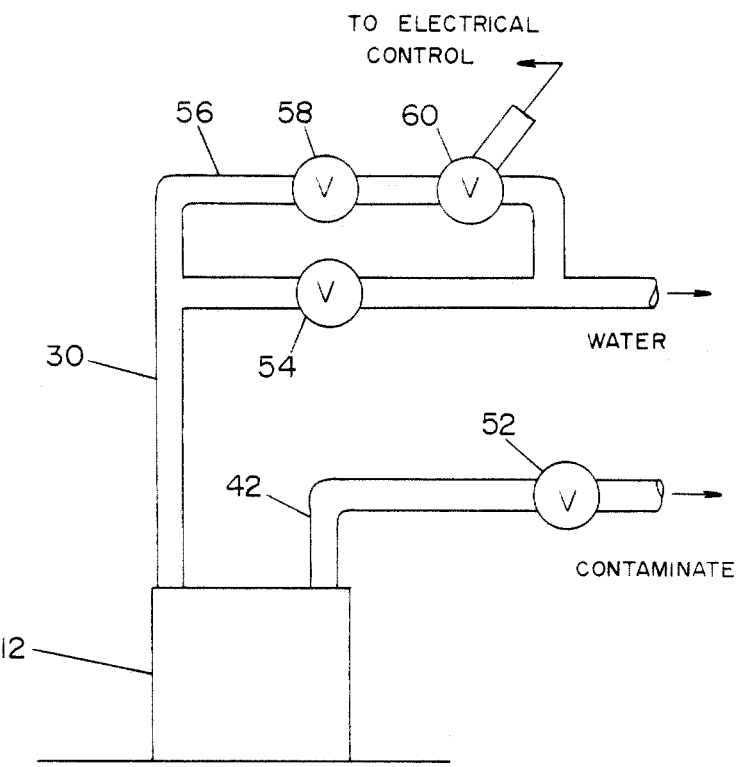
FIG. 2 is a simplified piping diagram of the above ground system used in conjunction with the preferred embodiment of the invention.

FIG. 2 is a simplified piping diagram of the above ground system used in conjunction with the preferred embodiment of the invention. Well 12 reaches the surface of ground 18 and contaminant pipe 42 and water pipe 30, each connected to their respective pumps within the well, exit from the top of well 12.

Contaminant pipe 42 simply feeds through manual valve 52 to a storage container (not shown). Valve 52 would normally be opened at the beginning of system operation and not used during operation.

Water pipe 30 feeds a water disposal system (not shown), but, in the preferred embodiment uses a parallel bypass control system for accurate control. Manual valve 54 is the main control of the water discharge, and branch 56 is used as a fine control. Branch 56 includes manual valve 58, which is used to set the amount of flow through branch 56, and solenoid valve 60 which turns the flow through branch 56 on and off. Solenoid valve 60 is controlled by lower sensors 46 and 48 (FIG. 1) so that branch 56 is opened and increases the water flow when contaminant-water interface 47 (FIG. 1) approaches the inlet to contaminant pump 40. When branch 56 is open the water level at the bottom of contaminant chamber 32 is lowered until sensor 48 reacts to lowering interface 47 and closes branch 56 so that the interface rises again.

OPERATION OF THE PREFERRED EMBODIMENT

When in-well pump skimmer 10 is first started, water pump 14 is turned on and manual valves 54 and 58 above ground are set to slowly draw down the liquid level in well 12. This essentially means that the water flowing through pump 14, pipe 30 and both manual valve 54 and branch 56 is somewhat greater than the amount of water entering well 12 from underground. It can be assumed that sensor 46 has reacted to water since the water level is high, and therefore branch 56 is kept open. Water entering water pump 14 is coming through both valve 22 and interconnecting pipe 34 into water chamber 30. Regulating valve 38 in interconnecting pipe 34 is set to limit the water flow from that source to considerably less than the total water flow from water pump 14. In the preferred embodiment the flow through regulating valve 38 is set for approximately three gallons per minute. Manual valve 54 above ground is set so that when branch 56 is closed off pump 14 does not quite remove all the water flowing into well 12. Thus with branch 56 open, the water removed from the well is slightly more than that entering, and with branch 56 closed the water removed is slightly less than the amount entering.

This action lowers the liquid level in the well to just the top of contaminant chamber 32 and therefore causes any additional liquid entering the well to spill over the top of contaminant chamber 32. Within contaminant chamber 32 water settles to the bottom and the contaminant rise to the top. Contaminant pump 40 then removes the contaminants from the upper portion of contaminant chamber 32 while the water is pumped through line 34 into water chamber 20 from which it is pumped to the surface.

Solenoid valve 60 above ground is turned on and off by sensors 46 and 48 in reaction to the rise and fall of water-contaminant interface 47, so that when the contaminants approach sensor 48 and the water chamber the water removal rate is slowed and interface 47 begins rising again until sensor 46 reacts and opens solenoid valve 60 to increase the water removal rate. The water level during operation therefore oscillators between sensors 46 and 48.

Back up sensor 50 is used to shut down water pump 14 if the contaminant level drops lower than the lowest normal sensor 48.

Contaminant pump 40 is essentially controlled by sensor 44 which turns the pump on when enough contaminants have been collected to activate sensor 44. Contaminant pump 40 is then turned off when sensor 46 senses water present at its level for a time in excess of 15 seconds.

The two pumps are therefore essentially independently controlled and pump their respective liquids as required. However, due to the top-skimming action of contaminant chamber 32, no contaminant is ever present in the well which might be reintroduced into the ground. All contaminants within the well immediately enter the isolated chamber, and even if not immediately pumped to the surface, they are trapped until pumped away.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For instance, safety sensor 50 could be omitted and a timer used to monitor lower sensor 48, so that water pump 14 is shut off when sensor 48 senses the presence of contaminant for too long a period. Also, contaminant pump 40 could be turned off by an additional sensor located at an appropriate level rather than the timed control described.

What is claimed as new and for which Letters Patent of the United States are desired to be secured is:

1. An apparatus for removing lighter-thanwater contaminants from within a well comprising:
    container means, closed except for an open top, supported within a well at a depth below the water table within the well including a dividing means to separate the container means into two chambers, one lower than the other, with a flow passage between the two chambers;
    first pumping means with its inlet located in the lower portion of the container means and connected so it raises liquid to the ground surface and out of the well;
    second pumping means with its inlet located in the upper portion of the container means and connected so it raises liquid to the ground surface and out of the well with the first pumping means located in the lower chamber and the second pumping means is located in the upper chamber;
    first sensor means located within the container means and between the inlets of the two pumping means controlling the first pumping means and distinguishing between water and a second liquid of lower specific gravity than water, so that as the second liquid approaches the inlet of the first pumping means, the first sensor means causes the first pumping means to reduce the quantity of liquid pumped, and as the second liquid rises to a predetermined level above the inlet of the first pumping means the first pumping means increases the quantity of liquid pumped; and
    second sensor means located in the container means controlling the second pumping means and distinguishing between the presence and absence of a liquid other than water, so that the second pumping means is started when the liquid other than water has reached a predetermined level above the inlet of the second pumping means, and the second sensing means turns off the second pumping means when water approaches the inlet of the second pumping means.

2. The apparatus of claim 1 further including limited unidirectional flow control means between the two chambers so that liquid flows only from the upper chamber to the lower chamber at a predetermined flow rate.

3. The apparatus of claim 1 further including a unidirectional flow control means interconnecting the lower portion of the container means within which the first pumping means is located with the liquid outside the container means so that liquid in the well adjacent to the lower portion of the container means can flow from the well into the lower portion of the container means but none can flow out.

4. The apparatus of claim 1 further including control means for the first pumping means which is connected to the first pumping means and controls the flow through the first pumping means so that the highest level of liquid within the well is maintained at approximately the level of the top of the container means.

5. The apparatus of claim 4 wherein the control means is a solenoid valve in a bypass pipe parallel to an outlet pipe from the first pumping means and the solenoid valve is interconnected with and controlled by the first sensor means.

6. The apparatus of claim 1 further including a third sensor means located below the level of the second sensor means and acting to shut off the first pumping means if it senses an absence of water.

7. The apparatus of claim 1 wherein the container means is located at a depth within the well so that the top of the container means is approximately at the lowest point of a cone depression.

* * * * *